April 21, 1953  J. DAUGHERTY  2,635,930
MACHINE TOOL
Filed Nov. 7, 1946  2 SHEETS—SHEET 1
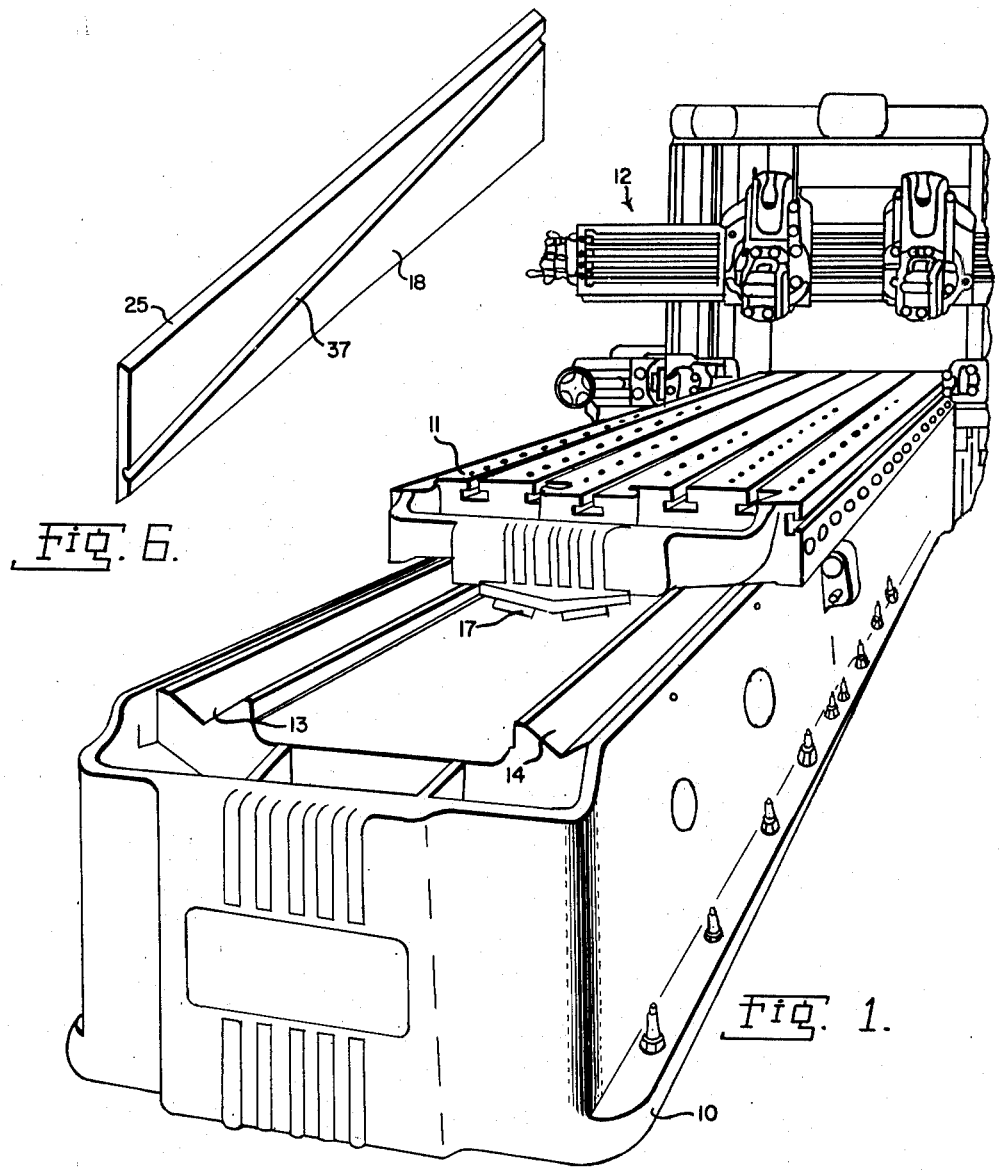
INVENTOR.
JESSE DAUGHERTY
BY
Joseph A. Rave
ATTORNEY April 21, 1953          J. DAUGHERTY          2,635,930
MACHINE TOOL
Filed Nov. 7, 1946          2 SHEETS—SHEET 2
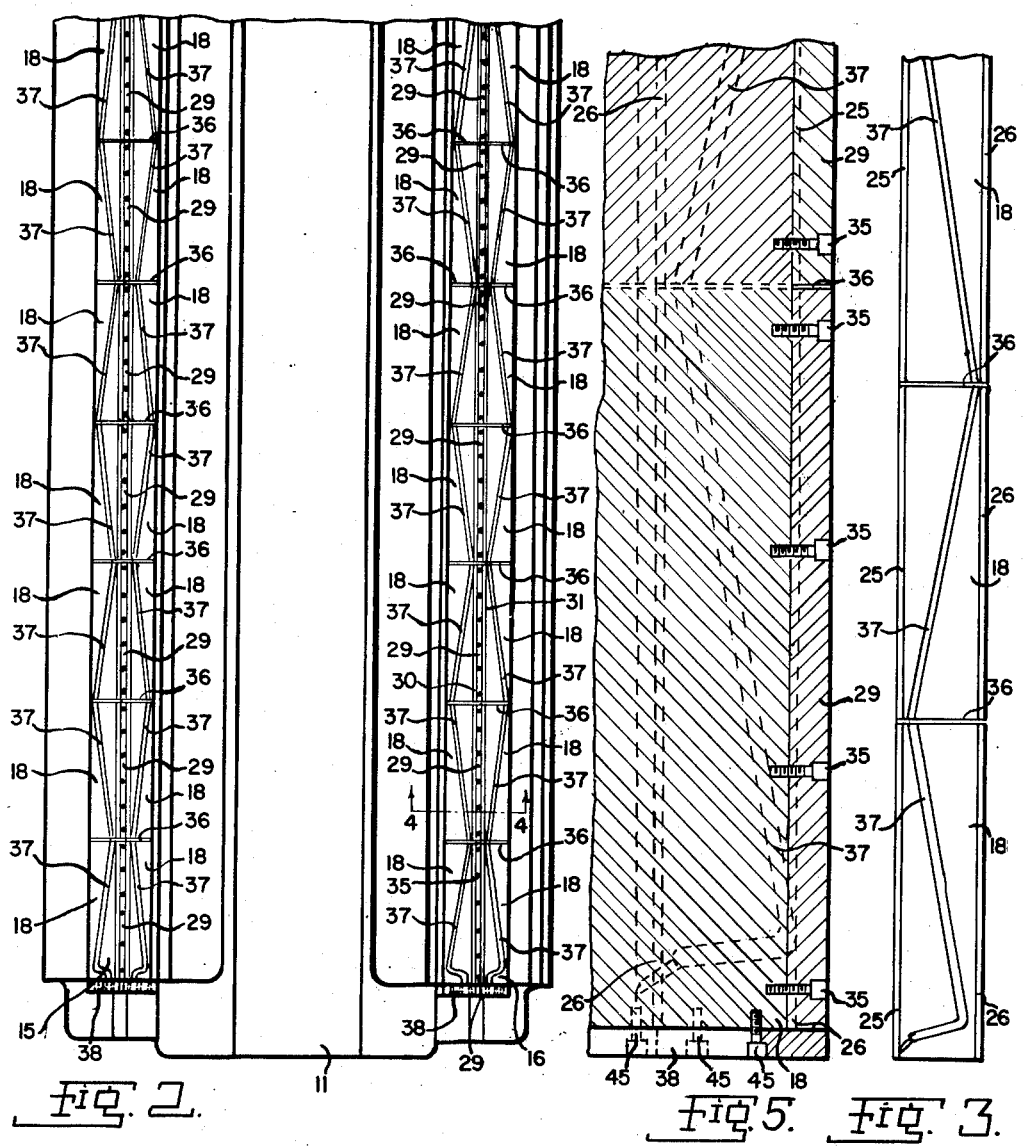
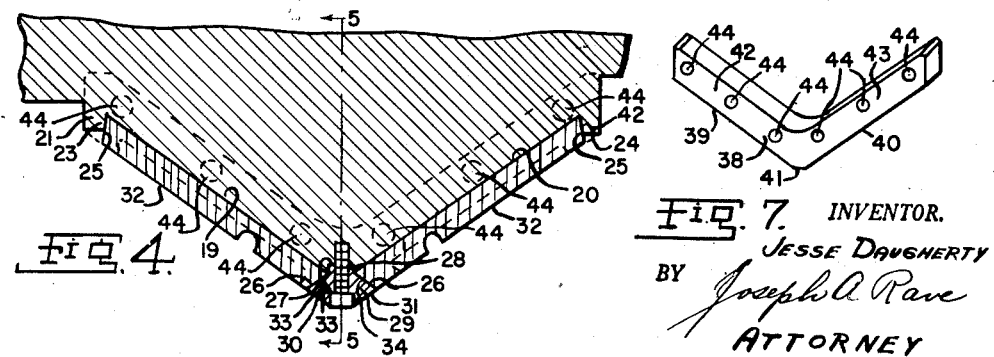
INVENTOR.
JESSE DAUGHERTY
BY Joseph A. Rave
ATTORNEY Patented Apr. 21, 1953

2,635,930

UNITED STATES PATENT OFFICE 2,635,930

MACHINE TOOL

Jesse Daugherty, Cincinnati, Ohio, assignor, by mesne assignments, to Giddings & Lewis Machine Tool Company, Fond du Lac, Wis., a corporation of Wisconsin Application November 7, 1946, Serial No. 708,417

12 Claims. (Cl. 308—3)

This invention relates to improvements in machine tools and particularly to improvements on the bearing surfaces of work supporting table guides in machine tools wherein the said work supporting table reciprocates axially relative to a supporting bed.

The invention will be described in connection with the table of a metal planer, but it is to be understood that the invention is not limited to metal planers but may be employed on any installation where a bearing for a reciprocating member is required.

Modern metal planers are required to travel at high rates of speed, in the neighborhood of and above 300 ft. per minute, which generates considerable friction heat on the guides of the work supporting table and on the guide ways of the planer bed. This friction heat causes considerable warpage in the table due to expansion in the metal of the table thereby causing the table to bow with the result that the work being planed is not parallel. Another difficulty experienced is the scoring of the table guides and bed guide ways due to flash welding on the said guides and ways by the friction heat generated.

In order to overcome these difficulties the most desirable bearing surface would be one that prevents the generation of friction heat thereby eliminating the cause of bowing in the table and at the same time prevent the scoring of the table ways, and bed guide ways. The nearest solution to this problem, as disclosed in the present application, is the provision of a bearing surface which, while it may not prevent the generation of friction heat, does minimize the transfer of said friction heat to the table guides and the table proper, thereby reducing the warpage or bowing of the table to a minimum. At the same time the said bearing surface, being non-metallic, reduces to a minimum the flash welding and thereby prevents scoring of the table guides and bed guide ways. It is to be noted that the scoring of the table guides and bed guide warpages, produces irregularities that result in, what is technically called chattering in the work and therefore an undesirable finish on the work.

It is, therefore, the principal object of the present invention to provide a comparatively soft heat insulating bearing surface between the guides and guide ways for reciprocating members to prevent transfer of friction heat and scoring of the bearing surfaces thereof.

Another object of the present invention is the provision of a guide bearing surface to accomplish the foregoing object that is economical to produce without sacrificing efficiency in use.

It has been found that certain materials, which can be utilized to accomplish the foregoing objects, have a co-efficient of thermal expansion different from that of the table or member to which the bearing surfaces are attached. Moreover, certain materials utilizable for this purpose have a tendency to "grow," that is, expand when in the presence of liquids. This growing or expanding is more pronounced when water is the liquid than when oil is used as the lubricant. It is therefore a further object of this invention to provide, on a reciprocating table or member, means for mounting the bearing material that permits relative expansion and contraction thereof relative to the table ways.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a perspective view of a metal planer having embodied therein the improvements of this invention.

Fig. 2 is a bottom plan view, on an enlarged scale, of a portion of the work supporting table of Fig. 1.

Fig. 3 is an enlarged elevational view of a portion of one bearing face illustrating the improvements of this invention.

Fig. 4 is an enlarged fragmentary sectional view taken transversely of one of the guides of the table as seen for example from line 4—4 on Fig. 2.

Fig. 5 is a longitudinal sectional view through a portion of a table guide taken at right angles to Fig. 4 on line 5—5 on said Fig. 4.

Fig. 6 is a perspective view of one of the bearing plates or bearing blocks forming a detail of the invention.

Fig. 7 is a perspective view of a table guide end plate forming a detail of the invention.

Throughout the several views of the drawings, similar reference characters are employed to denote the same or similar parts.

As was noted above this invention is being illustrated and will be described as applied to a metal planer which, as seen in Fig. 1, comprises a bed 10, a work supporting table 11 and a tool supporting mechanism indicated in general by the reference character 12. The tool supporting mechanism 12 may be of various constructions and may include two uprights, as illustrated in Fig. 1, that support the cross rail, or it may include but a single upright for supporting the cross rail, it being understood that the tool supporting mechanism forms no part of the present invention.

The bed 10 is provided longitudinally thereof, adjacent its longitudinal sides, with guide ways illustrated in Fig. 1 as of V-shape and indicated by the reference characters 13 and 14. The V-ways 13 and 14 are the most desirable but may be flat or a combination of flat and V formation. Cooperating with and received on the bed V-ways are the table guides 15 and 16 which closely conform in cross section to the V-ways 13 and 14. The table 11 is reciprocated by any suitable or desirable means, that illustrated in the drawings consisting of a rack 17 that meshes with a driving gear (not shown) rotatable from any suitable or desirable motive force (not shown).

In the past bed guide ways 13 and 14 and the table guides 15 and 16 have been formed of metal wherefore a metal to metal sliding surface resulted. To reduce friction and assist in ready reciprocation of the table 11 lubricant under pressure was supplied to the said guides and ways but, as was noted above, with present day high speeds considerable friction heat was nevertheless developed, resulting in bowing of the table and scoring of the coacting guide surfaces.

In order to reduce transfer of the friction heat from the table guides 15 and 16 to the table proper, use is made of heat insulating bearing blocks or plates 18 arranged in intimate face contact with the guide faces 19 and 20 as illustrated most clearly in Fig. 4. In order to retain the bearing plates or blocks 18 in operative position, the table guide surfaces 19 and 20 are provided at their respective outer longitudinal edges with lips 21 and 22. Inner faces of the respective lips are undercut as at 23 and 24 to provide angular recesses. Each of the bearing plates or blocks 18 is provided along its outer edge with an inclined face 25 that corresponds with the angle of inclination of the lip or rib faces defined by undercuts 23 and 24. This construction quite closely simulates a dove-tail arrangement.

The other or inner side of each of the insulating plates or blocks 18 is similarly formed to provide an inclined edge 26.

In the specific illustration in the drawings the apex of the table V-guide is channeled longitudinally thereof as at 27 to receive the tongue 28 of a retaining strip 29. The retaining strip 29, below the tongue 28, is substantially diamond shaped thereby providing outermost or sliding surfaces 30 and 31 which are aligned with the bearing surfaces 32 of the bearing blocks or plates 18 on each face 19 and 20 of the V shaped guide. The remaining faces 33 and 34 of the retaining strip 19 correspond with the inclined edge 26 of the bearing plates or blocks 18 and complete the dove-tailed recess in the table guide surfaces for the said bearing plates or blocks 18. The retaining strip 29 is held in operative position by means of a plurality of screws or bolts 35.

In practice, and for convenience, the bearing plates or blocks 18 are of relatively short lengths as is the retaining strip 29. It has been found that making or constructing the bearing plates or blocks 18 and retaining strip sections 29 of bearing material of a laminated condensation product gives the desired result, namely, insulation against friction heat transfer and a sufficient yielding to grit and the like between the bed guide ways and table guides to prevent scoring and other damage to the said ways.

As was further noted above the bearing plates or blocks 18 may have a co-efficient of thermal expansion greater than the metal of the table guides. But even though the bearing plates or blocks 18 have the same co-efficient of thermal expansion as the metal of the planer table guides, they are subject to becoming hotter than the metal parts and therefore undergo greater expansion due to the fact that they are directly in contact with the heat due to friction. As noted above, the plates may also have a tendency to expand upon absorption of lubricants and the like. To provide for expansion of the bearing plates 18 due to any one or more of the above factors, the plates are mounted to have a space 36 between them equal to the total expansion of the individual bearing plates under the most extreme conditions. In other words the plates or blocks 18 are permitted to elongate independently of the table guide. Thus, the plates 18 are not tightly clamped between the table lip surfaces 23 and 24 and the opposed inclined surfaces 33 and 34 of the retaining strip 29. Instead, a transverse clearance is provided that will permit the greatest transverse expansion of the plates 18 occurring under the most extreme operating conditions.

Since the plates or blocks 18 are nowise held against movement relative to their respective buttressing surfaces 19, 20, they may be bodily shifted upon reversal of the table and may be brought into end abutment at either or both ends of the table movement. However, this shifting of the bearing plates will not interfere with their individual expansion.

As was noted above the bed ways and table guides are provided with lubricant which is automatically distributed by the bearing surfaces of said ways and guides. In order to assist in distributing this lubricant, the plates or blocks 18 are provided with oil grooves 37. Each successive plate or block 18 has its oil groove continuing from the point where the groove of the preceding plate stopped, as is clearly illustrated in Fig. 2. In other words the first bearing plate or block 18 has its groove inclining toward the left while the second bearing plate or block has its groove inclining toward the right with the third bearing plate or block groove inclining toward the left and so on for the full length of the table guide surface, as clearly illustrated in Fig. 1. It is to be understood however that the specific grooving is not critical.

In order to prevent the complete displacement of the bearing plates or blocks 18 from the table guide surfaces there is provided end plates or members 38 substantially V-shaped in elevational profile each having its outer edges 39 and 40 corresponding to the bearing surfaces 32 of the plates or blocks 18 when mounted in operative position on the table guide. The apex formed by the sides 39 and 40 is truncated or flattened as at 41 to correspond with the flat top of the retaining strip sections 29. Each of the arms 42 and 43 of each end plate or member 38 is provided with a plurality of apertures 44 to receive bolts or the like 45 which are threaded into the ends of the guides 15 and 16 to secure them in operative position. The said end plates or members 38 are preferably formed of the same material as the bearing plates or blocks 18.

What is claimed is:

1. In a machine tool, a supporting bed having guide ways, a reciprocating member having guides received on the bed guide ways, heat insulating bearing plates having continuous unbroken bearing surfaces relatively yieldable by comparison with the bed guideways and disposed on said respective reciprocating member guides between the latter and said bed guide ways, and elongated attaching means extending along the opposite longitudinal edges of each reciprocating member guides for cooperating engagement with the adjacent edges of said bearing plates for holding the bearing plates in position relative to said reciprocating guides.

2. In a machine tool, a supporting bed having guide ways, a reciprocating member having guides received on the bed guide ways, heat insulating bearing plates having bearing surfaces relatively yieldable by comparison with the bed guideways on said reciprocating member guides between said guides and bed guide ways, and means extending longitudinally of the upper and lower edges of each reciprocating member guide for cooperating engagement with the adjacent edges of said bearing plates for holding the bearing plates against the guides, said bearing guides and holding means being so constructed and arranged that the bearing plates have a limited amount of bodily movement transversely and longitudinally of the reciprocating member guides and additional means at the ends of the reciprocating member guides for limiting the bodily movement of the bearing plates to prevent displacement of the bearing plates longitudinally of the said guides.

3. In a machine tool organization, a supporting bed, guide ways on said bed, a work supporting table having guides received on said table guide ways, heat insulating plates between the table guides and bed guide ways, and means for holding said heat insulating bearing plates to the table guides comprising a rib longitudinally of each guide at one longitudinal edge thereof undercut to receive a correspondingly inclined adjacent face of the insulating plate, and a retaining strip carried by the guide at the other longitudinal edge thereof cooperating with the rib to form a groove for the bearing plates for retaining same in the rib undercut, said groove having a base of greater dimension than that of the contacting bearing plates so that said bearing plates have limited bodily movement transversely of the table guide ways.

4. In a machine tool organization, the combination of a supporting bed, a reciprocating work supporting table on said bed, guide ways on said bed and guides on said table cooperating with the bed guide ways, heat insulating bearing plates between the table guides and bed ways, said heat insulating plates having a dove tail transverse cross section and said table guides having formed therein a dove tail groove longitudinally thereof for receiving and containing the bearing plates, said dove tail groove having a base dimension greater than the base dimension of the bearing plates so as to provide clearance for the bearing plates in the groove and permit independent bodily movement transversely and longitudinally of the table guides, and means carried by the table guides to limit the bodily movement of the bearing plates longitudinally of the table guides.

5. In a machine tool organization, the combination of a supporting bed, a reciprocating work supporting table on said bed, guide ways on said bed and guides on said table cooperating with the bed guide ways, heat insulating bearing plates between the table guides and bed ways, said heat insulating plates having a dove tail transverse cross section and said table guides having formed therein a dove tail groove longitudinally thereof for receiving and containing the bearing plates, said dove tail groove having a base dimension greater than the base dimension of the bearing plates so as to provide clearance for the bearing plates in the groove and permit independent bodily movement transversely and longitudinally of the table guides, and means carried by the table guides at the ends thereof for closing the ends of the dove tail groove to limit the bodily movement of the bearing plates longitudinally of the table guides.

6. In a machine tool organization, a reciprocating work supporting member having a plurality of guide bearing receiving surfaces, heat insulating bearing plates, each having a bearing surface relatively yieldable by comparison with the guide bearing receiving surface on each bearing receiving surface, and means extending longitudinally of the upper edge and the lower edge of each guide bearing receiving surface for cooperating engagement with the adjacent edges of its bearing plate for holding the bearing plate against its bearing receiving surface, each bearing plate and its holding means being so constructed and arranged that the bearing plate has a limited amount of bodily movement in transverse and longitudinal directions without becoming disassociated from its bearing receiving surface, and additional means at the ends of each guide bearing receiving surface to limit the bodily movement of each bearing plate to prevent displacement of the bearing plates longitudinally from the said bearing receiving surfaces.

7. In a machine tool organization, a reciprocating member having guides each including at least one bearing receiving surface, a dove tail groove longitudinally of each bearing receiving surface, a plurality of heat insulating bearing plates having bearing surfaces relatively yieldable by comparison with the guide bearing receiving surface in each dove tail groove, said bearing plates having a transverse dimension less than the corresponding dimension of the dove tail groove to permit a limited amount of bodily transverse movement of the bearing plates, said bearing plates, longitudinally of each bearing receiving surface, having their adjacent edges spaced from one another to permit movement thereof longitudinally of the bearing receiving surface, and means carried by the guides at the opposite ends thereof for closing the ends of the dovetail grooves to prevent disassociation of the bearing plates and guides upon reverse reciprocation of the reciprocating member.

8. In a machine tool organization, a reciprocating member having bearing guides, each guide having a bearing receiving surface, a rib integral with and projecting from one longitudinal edge of each bearing receiving surface, each rib having a face contiguous with its guide bearing receiving surface undercut to form a recess, a plurality of bearing plates against each bearing receiving surface having one edge thereof received within the rib undercut recess, and a retaining strip along the opposite longitudinal edge of each bearing receiving surface for engaging the bearing plates to hold same in the rib undercut recess, said bearing receiving surface between the rib undercut and retaining strip having a dimension greater than the similar dimension of the bearing plates so that a limited amount of bodily movement is afforded the said bearing plates relative to their bearing receiving surface.

9. In a machine tool organization, a reciprocating member having bearing guides, each guide having a bearing receiving surface, a rib integral with and projecting from one longitudinal edge of each bearing receiving surface, each rib having a face contiguous with its guide bearing receiving surface undercut to form a recess, a plurality of bearing plates against each bearing receiving surface having one edge thereof received within the rib undercut recess, and a retaining strip along the opposite longitudinal edge of each bearing receiving surface for engaging the bearing plates to hold same in the rib undercut recess, said bearing receiving surface between the rib undercut and retaining strip having a dimension greater than the similar dimension of the bearing plates so that a limited amount of bodily movement is afforded the said bearing plates relative to their bearing receiving surface, said retaining strip being removably attached to the guide and provided on its face opposed to the rib undercut recess with an inwardly inclining surface cooperating with the rib undercut recess in retaining the bearing plates in position.

10. In a machine tool, the combination of a reciprocable member, a plurality of parallel guides on said member each defining an elongated bearing plate support surface, said guides each having a rib integral therewith and projecting from one longitudinal edge of the support surface on the guide, the sides of said respective ribs adjacent associated ones of said support surfaces being undercut to define faces continuous with the respective surfaces and inclined relative thereto at acute angles to define therewith recesses extending along the marginal edges of said respective surfaces, a plurality of bearing plates of heat insulating material positioned on each of said support surfaces, said plates each having one marginal edge disposed within the one of said recesses at the marginal edge of the underlying one of said surfaces, a retaining strip removably attached to said guides and disposed along the longitudinal edge of each of said surfaces opposite from said respective recesses, the sides of said strip opposing said respective rib recesses being undercut to define faces inclined at acute angles with respect to said respective surfaces and defining therewith second recesses receiving longitudinal edges of said bearing plates remote from said rib recesses, said ribs and said strip cooperating with said bearing plates to retain the latter positioned against said respective surfaces while permitting bodily movement relative thereto, and end plates carried by opposite ends of said guides and projecting outwardly beyond said respective surfaces to block movement of said plates through the longitudinal ends of said recesses.

11. In a machine tool, the combination of a supporting bed, an upwardly facing support guide on said bed, said guide being recessed to define an elongated V-shaped guide bearing, a translatable member having a V-shaped guide mating with said bed guide and slidable thereon to movably support said member on said bed, said translatable guide defining inclined guide plate receiving surfaces on opposite sides thereof and extending transversely from a medial apex extending longitudinally along the guide, two longitudinal guide plate abutments on said movable guide disposed in raised relation to said respective surfaces and extending along the longitudinal edges thereof remote from said apex, an elongated heat insulating bearing plate on each of said plate receiving surfaces and presenting bearing surfaces of less hardness than said bed guide bearing, one longitudinal edge of each of said plates being in abutting engagement with the contiguous one of said abutments, and a retaining strip attached to said translatable guide to extend longitudinally along said apex thereof in abutting relation to the longitudinal edges of said bearing plates remote from said respective abutments.

12. In a machine tool, the combination of a supporting bed defining an elongated table supporting surface on the upper side thereof, a translatable table on said bed, guide means on the underside of said table having mating engagement with said table supporting surface, said guide means defining and including an elongated bearing plate receiving surface, an elongated bearing plate of non-metallic insulating material disposed in overlying relation to said last mentioned surface and presenting a smooth unbroken bearing surface, elongated abutment means extending along one longitudinal edge of said plate receiving surface to engage the contiguous longitudinal edge of said plate, a retaining strip detachably mounted on said guide means along the opposite longitudinal edge of said plate receiving surface to engage the opposite longitudinal edge of said plate, and end plates fixed to opposite ends of said guide means to project outwardly beyond said plate receiving surface for blocking movement of said bearing plate beyond either longitudinal end of said last mentioned surface.

JESSE DAUGHERTY.

References Cited in the file of this patent

UNITED STATES PATENTS

| Number | Name | Date |
|---|---|---|
| Re. 19,448 | Johnson | Feb. 5, 1935 |
| 1,685,434 | Parkes | Sept. 25, 1928 |
| 2,378,343 | Walter | June 12, 1945 |